(12) United States Patent
Misawa et al.

(10) Patent No.: US 8,395,820 B2
(45) Date of Patent: Mar. 12, 2013

(54) IMAGE PROCESSING APPARATUS FOR PRINTING IN BLACK COLORING MATERIAL BASED ON ATTRIBUTE INFORMATION

(75) Inventors: Reiji Misawa, Tokyo (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 12/473,050

(22) Filed: May 27, 2009

(65) Prior Publication Data

US 2009/0296157 A1 Dec. 3, 2009

(30) Foreign Application Priority Data

May 30, 2008 (JP) ................. 2008-142938

(51) Int. Cl.
*H04N 1/40* (2006.01)
(52) U.S. Cl. ........................ 358/3.24; 358/1.9
(58) Field of Classification Search ............. 358/3.24, 358/1.9
See application file for complete search history.

(56) References Cited

U.S. PATENT DOCUMENTS

| | | | |
|---|---|---|---|
| 6,633,673 B1 * | 10/2003 | Shen ....................... | 382/232 |
| 2003/0179419 A1 * | 9/2003 | Abe ....................... | 358/474 |
| 2003/0202196 A1 | 10/2003 | Ooki | |
| 2004/0061912 A1 | 4/2004 | Ohga | |
| 2008/0055678 A1 | 3/2008 | Miyazaki | |

FOREIGN PATENT DOCUMENTS

| | | |
|---|---|---|
| JP | 2001-309189 A | 11/2001 |
| JP | 2003-320715 A | 11/2003 |
| JP | 2004-112695 A | 4/2004 |
| JP | 2004-120566 A | 4/2004 |
| JP | 2006-041792 A | 2/2006 |
| JP | 2008-061069 A | 3/2008 |

* cited by examiner

*Primary Examiner* — Qian Yang
(74) *Attorney, Agent, or Firm* — Canon USA Inc. IP Division

(57) ABSTRACT

An image processing apparatus which sends attribute information to an output correction unit configured to determine based on the attribute information whether to print with only a black coloring material (K) or to print with a plurality of coloring materials (CMYK), includes an attribute change unit configured to make a determination to perform processing for changing the attribute information of compressed data, whose rendering color is monochrome and which is compressed by a compression format (MMR) for compressing a monochromatic image, from an attribute which is printed with a plurality of coloring materials to an attribute which is printed with only a black coloring material, and to perform the processing for changing the attribute information based on the determination.

25 Claims, 12 Drawing Sheets

IMAGE PROCESSING APPARATUS FOR PRINTING IN BLACK COLORING MATERIAL BASED ON ATTRIBUTE INFORMATION

BACKGROUND OF THE INVENTION

1. Field of the Invention

The present invention relates to an image processing apparatus, which sends attribute information to a unit for selecting whether to perform printing in only a black coloring material or to perform printing in a plurality of coloring materials based on the attribute information, a method for controlling the image processing apparatus, and a program for implementing the image processing and the control method.

2. Description of the Related Art

Conventionally, for example, when printing is performed, a printing apparatus (printer), which prints color page or monochrome page information, converts page description language (PDL) data into intermediate data, which is called a display list, and rasterizes the intermediate data into RGB bitmap image data. The printing apparatus converts the RGB bitmap image data into CMYK bitmap image data, and then supplies the converted image data to a printer engine.

The PDL data is described by a rendering command for rendering various objects. Commonly known rendering commands include, for example, PS, PCL, LIPS, and PDF. The rendering command is different for each PDL data.

The printing apparatus receives the PDL data, interprets the rendering command by processing called "interpreter", and converts the PDL data into intermediate data called a display list, in which the rendering commands are listed. When converting the PDL data into the intermediate data, different rendering commands in PS, PCL, LIPS, and PDF, are converted into a common rendering command. Next, the intermediate data is rasterized into RGB bitmap image data by processing known as "rendering". Simultaneously, attribute information is generated based on a description of the rendering command. The attribute information is information for indicating what kind of region the object to be rendered by the rendering command belongs to. The attributes which may be included in the attribute information include a text attribute, a graphic attribute, and an image attribute. The generated attribute information is assigned to a pixel unit of RGB bitmap image data, and is held in association within association with each pixel of the RGB bitmap image data.

When a pixel value of a target pixel of the RGB bitmap image data is R=G=B, there is a function called "gray compensation" which determines whether CMYK coloring materials are used or whether only a black (K) coloring material is used, based on the attribute information in the target pixel. Technology concerning gray compensation is discussed in Japanese Patent Application Laid-Open No. 2003-320715.

In gray compensation, if the attribute information of the target pixel is a text attribute or a graphic attribute, to prevent the problem of color misregistration caused by mixing of the CMYK coloring materials, only a black coloring material is used. On the other hand, with respect to an image attribute, since there is a limit in the gradation range when printing with only a black coloring material, emphasis is placed on gradation, and CMYK coloring materials are used.

The reason why printing which uses CMYK coloring materials has better gradation than printing which uses only a black coloring material will now be described. First, to perform printing using only a black coloring material, when the pixel value of the RGB bitmap image data is R=G=B, C=M=Y=0%. Therefore, CMYK bitmap image data in which only K has a concentration, has to be generated. This CMYK bitmap image data is termed "K monochromatic bitmap image data". Here, the gradation range of the K monochromatic bitmap image data is in a K concentration range of 0 to 100% (integer). Namely, for K monochromatic bitmap image data, an intermediate concentration between a concentration of C=M=Y=0% and K=30% and a concentration of C=M=Y=0% and K=31% cannot be expressed. On the other hand, to perform printing using CMYK coloring materials, when the pixel value of the RGB bitmap image data is R=G=B, CMYK bitmap image data having concentrations of C=c %, M=m %, Y=y %, and K=k % has to be generated. The CMY concentrations of c %, m %, and y % do not have to be perfectly the same. For example, C=31%, M=32%, Y=30%, and K=0% is acceptable. More specifically, in the case of CMYK bitmap image data, an intermediate concentration between a concentration of C=30%, M=30%, Y=30%, and K=0% and a concentration of C=31%, M=31%, Y=31%, and K=0% may be expressed, for example, as follows: C=31%, M=30%, Y=30%, K=0%

C=31%, M=31%, Y=30%, K=0%
C=30%, M=30%, Y=30%, K=1%

Thus, a print which uses CMYK coloring materials can have better gradation than printing which uses only a black coloring material.

However, when the printing apparatus receives bitmap image data of a scanned paper document as the PDL data, the PDL data may be compressed in a compression format for compressing a monochrome image such as MMR, JBIG, and PNG. In this data compressed in such a compression format, the attribute information is generated as an image attribute even if the pre-compression object was text, for example. Therefore, when selecting whether to perform printing in only a black coloring material or to perform printing in a plurality of coloring materials based on the attribute information, the printing is performed by a non-optimal coloring material for the object. Consequently, image quality is deteriorated. For example, when the above-described gray compensation is applied, CMYK coloring materials are used even if the rendering color of the object is monochrome text. As a result, the image quality deteriorates due to color misregistration caused by mixing of the CMYK coloring materials.

SUMMARY OF THE INVENTION

According to an aspect of the present invention, an apparatus which sends attribute information to a selection unit configured to determine based on the attribute information whether to print with only a black coloring material or to print with a plurality of coloring materials, includes a determination unit configured to make a determination to perform processing for changing the attribute information of compressed data, whose rendering color is monochrome and which is compressed by a compression format for compressing a monochromatic image, from an attribute which is printed with a plurality of coloring materials to an attribute which is printed with only a black coloring material, and a change unit configured to perform the processing for changing the attribute information of the compressed data based on the determination made by the determination unit before the attribute information is sent to the selection unit.

According to another aspect of the present invention, printing can be performed by the optimal coloring material for the original attribute information of an object, for an object whose rendering color is monochrome, and which is compressed by a compression format for compressing a monochromatic image. As a result, mixing of the coloring materials can be prevented and deterioration in image quality can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

A first exemplary embodiment will now be described in which high-compression PDF data including monochrome text compressed by MMR is printed by a printing apparatus.

PDF is an example of data which includes data compressed in a format for compressing monochromatic images, such as MMR, JBIG, and PNG. However, the present invention is not limited to the printing using PDF. For example, XPS and OpenOffice XML may also be used.

The printing apparatus (printer) will now be described using FIGS. 5, 6, 7 and 9.

Figure 5:
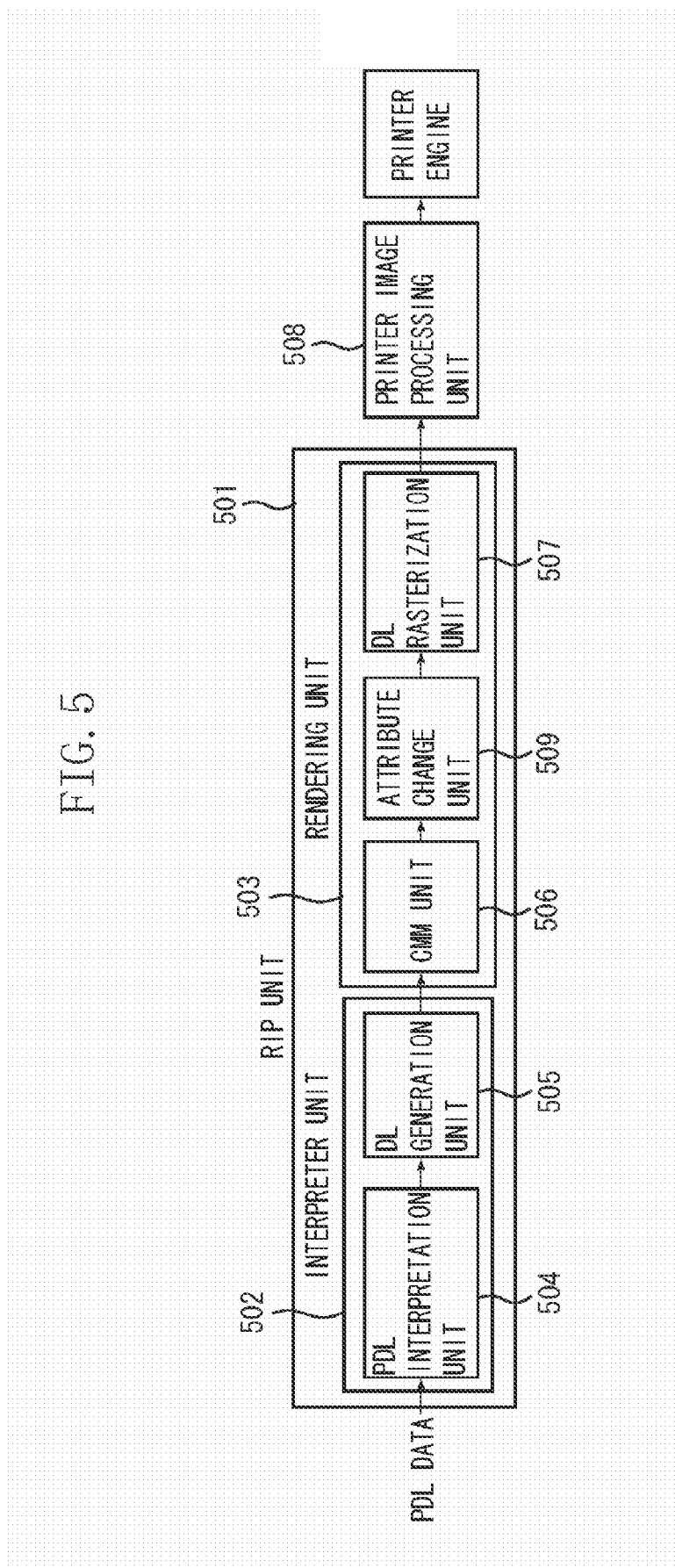
FIG. 5 is a configuration diagram illustrating a printing apparatus.

First, the configuration and operations of the printing apparatus will be described. FIG. 5 is a configuration diagram of the printing apparatus applied to the present exemplary embodiment. A raster image processor (RIP) unit 501 is typically configured of two units, an interpreter unit 502 and a rendering unit 503. The interpreter unit 502 is configured by a PDL interpretation unit 504 and a display list (DL) generation unit 505. The rendering unit 503 is configured by a color matching module (CMM) unit 506 and a DL rasterization unit 507.

When printing is performed, the PDL data is input into the RIP unit 501 based on the PDL. The PDL data is described by a rendering command for rendering a text, graphic, or image object.

The PDL interpretation unit 504 interprets the rendering command. The DL generation unit 505 converts the PDL data interpreted by the PDL interpretation unit 504 into intermediate data called a "display list", in which the rendering commands are listed. When the PDL data is converted into the intermediate data, different rendering commands such as PS, PCL, LIPS, and PDF are converted into a common rendering command.

The CMM unit 506 performs color matching of RGB bitmap image data which is the intermediate data generated by DL generation unit 505, into the RGB bitmap image data which can be printed by the printing apparatus.

The DL rasterization unit 507 receives the intermediate data which has undergone coloring material matching by the CMM unit 506 via an attribute change unit 509, rasterizes the intermediate data into RGB bitmap image data, and, when the input data is compressed data, decompresses the compressed data. The DL rasterization unit 507 also generates attribute information based on the rendering command generated by the DL generation unit 505. The attribute information is assigned to each pixel of the RGB bitmap image data, and is held in association with each pixel of the RGB bitmap image data.

The attribute information and the RGB bitmap image data rasterized by the DL rasterization unit 507 are transferred to a printer image processing unit 508. The printer image processing unit 508 converts the RGB bitmap image data into CMYK bitmap image data using the transferred attribute information and supply the converted result to a printer engine. The printer engine performs printing based on the supplied CMYK bitmap image data.

While the above is a description of the basic operation of the printing apparatus, in the present exemplary embodiment, a below-described processing performed by the attribute change unit 509 is carried out prior to the processing of the DL rasterization unit 507. The attribute change unit 509 changes the description of the rendering command generated by the DL generation unit 505 to generate the attribute information which is optimal for printing the object. Thus, the attribute change unit 509 performs processing for changing the attribute information when the DL rasterization unit 507 generates the attribute information. The description of the rendering command changed by the attribute change unit 509 is read into the DL rasterization unit 507, and the attribute information is generated based on the changed description. The attribute change unit 509 will be described in more detail below.

Here, the intermediate data generated by the DL generation unit 505 and the attribute information generated by the DL rasterization unit 507 will be described in more detail.

Figure 9:
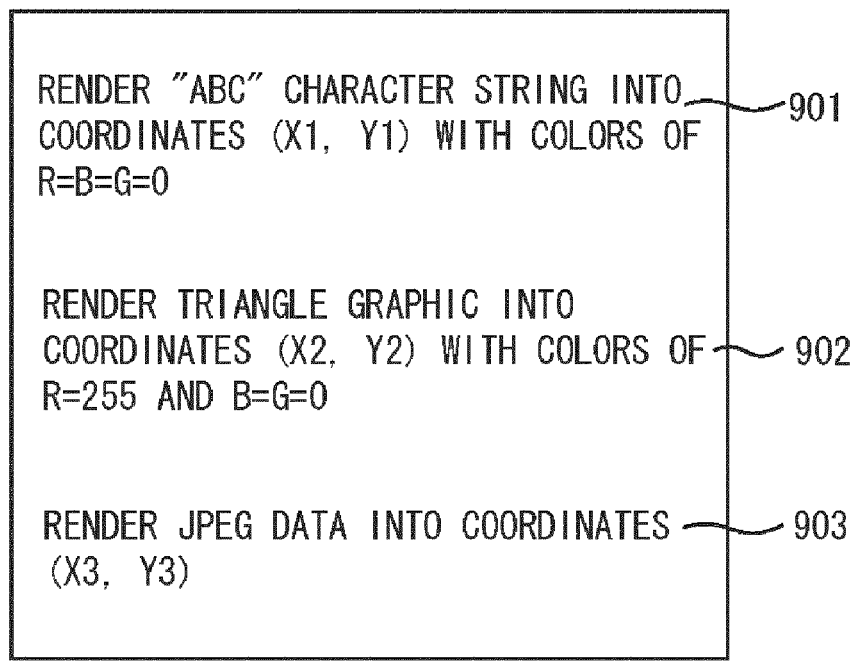
FIG. 9 illustrates intermediate data.
Figure 10:
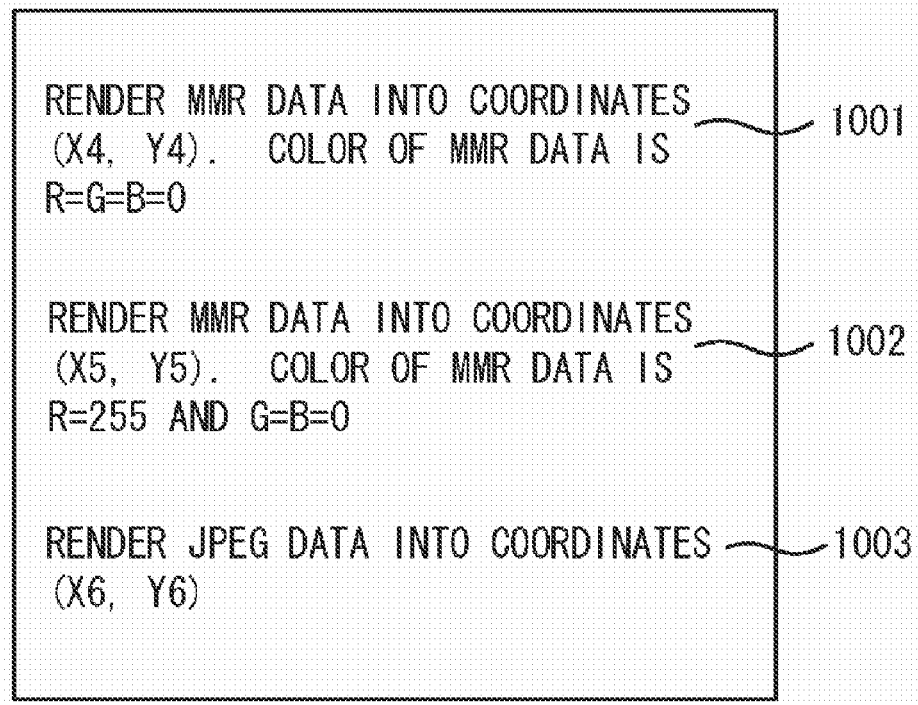
FIG. 10 illustrates intermediate data.

First, the intermediate data will be described in more detail using FIG. 9. FIG. 9 is an example of a rendering command for rendering a text, graphic, or image object. FIG. 9 is a simplified diagram for describing the intermediate data more specifically. However, the actual description is based on various rendering commands such as PS, PCL, LIPS, and PDF. FIG. 9 includes a rendering command 901 for rendering a text object, a rendering command 902 for rendering a graphic object, and a rendering command 903 for rendering an image object. As described above, the attribute information is generated based on the description of the respective rendering command by the DL rasterization unit 507. For example, since there is the description "character string" in the rendering command 901, the rendering command 901 generates the attribute information as a text attribute. Further, since there is the description "graphic" in the rendering command 902, the rendering command 902 generates the attribute information as a graphic attribute. Still further, since there is the description "JPEG data" in the rendering command 903, the rendering command 903 generates the attribute information as an image attribute. FIG. 10 is an example of a below-described high-compression PDF data rendering command. Since there is the description "MMR data" in a rendering command 1001, the rendering command 1001 generates the attribute information as an image attribute. By changing the description of this rendering command in the attribute change unit 509, the processing for changing the attribute information which is generated for the rendering command by the DL rasterization unit 507 can be performed.

Figure 7:
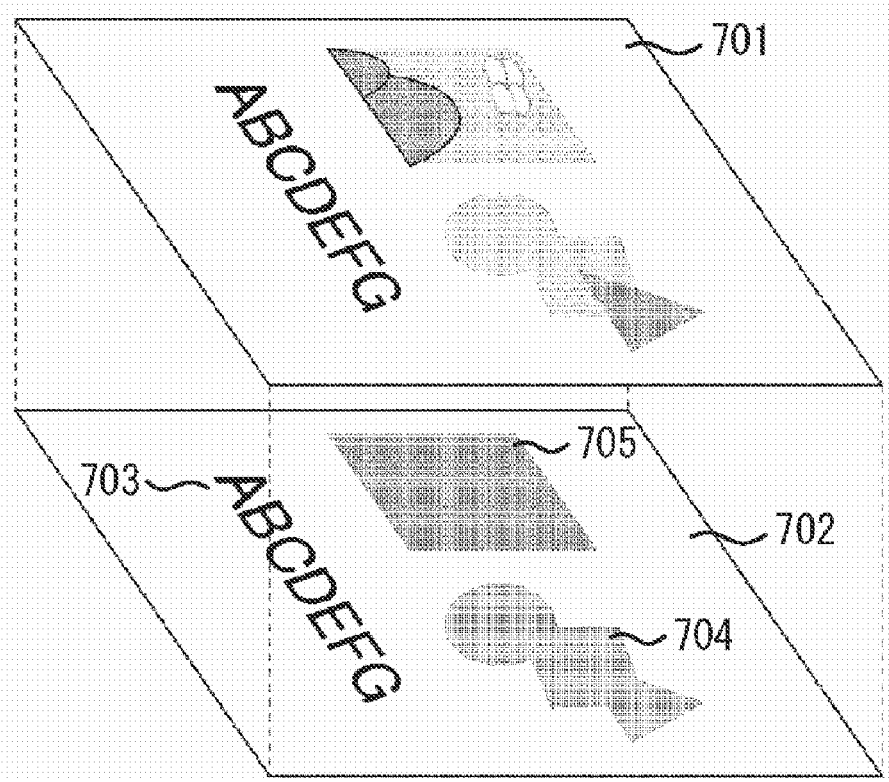
FIG. 7 illustrates attribute information.

Next, the attribute information will be described in more detail using FIG. 7. FIG. 7 includes RGB bitmap image data 701 rasterized by the DL rasterization unit 507 from the intermediate data, and attribute information 702 generated by the DL rasterization unit 507 based on the description of the rendering command of the intermediate data. In the present exemplary embodiment, the attribute information is expressed as 2-bit bitmap image data. In the intermediate data state, since attribute information 703 is described by a rendering command generated as a text attribute, the attribute information 703 is generated as a text attribute (e.g. a pixel value of "11" in 2-bit bitmap image data). Since attribute information 704 is described by a rendering command generated as a graphic attribute, the attribute information 704 is generated as a graphic attribute (e.g. a pixel value of "10" in 2-bit bitmap image data). Since attribute information 705 is described by a rendering command generated as an image attribute, the attribute information 705 is generated as an image attribute (e.g. a pixel value of "01" in 2-bit bitmap image data). However, generation of the attribute information is not limited to this method. The attribute information may be generated by some other method.

Figure 6:
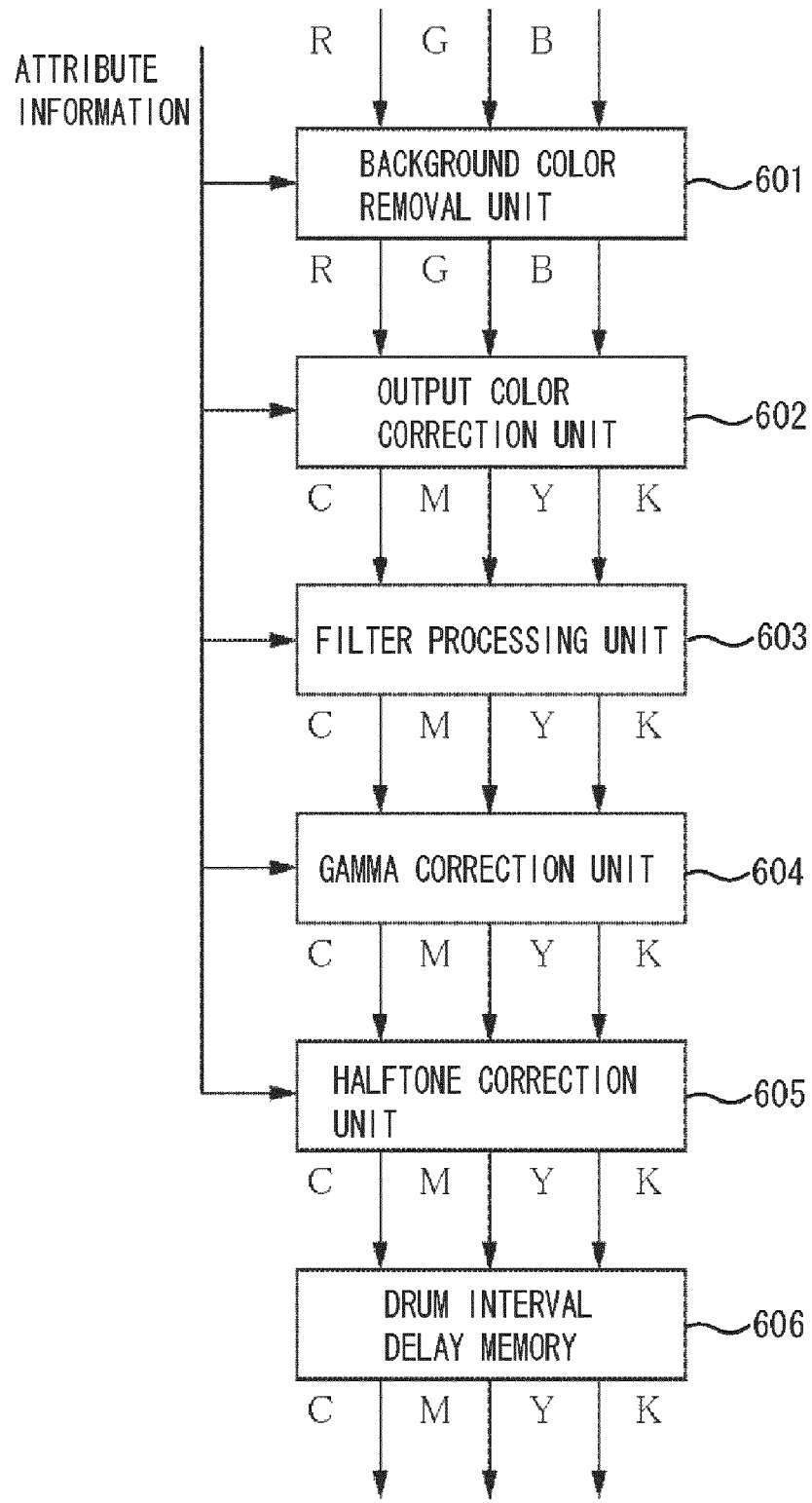
FIG. 6 is a block diagram illustrating image processing units of a printer.

Next, the printer image processing unit 508 will be described in more detail. FIG. 6 is a block diagram of the printer image processing unit 508. As described above, the RGB bitmap image data and the attribute information transferred from the RIP unit 501 are input into the printer image processing unit 508.

A background color removal unit 601 removes a background color of the RGB bitmap image data, and removes unnecessary background fogging.

An output color correction unit 602 converts the RGB bitmap image data into CMYK bitmap image data which matches the characteristics of the printer engine. More specifically, the output color correction unit 602 performs direct mapping. Direct mapping refers to processing in which the RGB bitmap image data pixel values are directly converted into CMYK bitmap image data pixel values by referring to a look-up table (LUT). Direct mapping does not require matrix calculation, which means nonlinear conversion can be performed. As a result, the degree of freedom of the color conversion is dramatically improved, and desired color reproduction can be realized while controlling the loaded amount of toner. For example, the pixel value (R=0, G=0, B=255) of the RGB bitmap image data is converted into the pixel value (C=90%, M=95%, Y=0%, K=0%) of the CMYK bitmap image data which matches the characteristics of the printer engine. The pixel values of the CMYK bitmap image data are expressed as a concentration value (%). Further, a state where the pixel value of the CMYK bitmap image data is C=M=Y=0% and only K has a concentration is termed "K monochromatic".

The processing performed by the output color correction unit 602 can be selected based on the attribute information by a function called "gray compensation". More specifically, when the pixel value of the RGB bitmap image data is R=G=B, K monochromatic CMYK bitmap image data is generated for pixels having a text attribute or a graphic attribute. As a result, the CMYK bitmap image data is printed only with a black coloring material. For pixels having an image attribute, four-color CMYK bitmap image data is generated. As a result, the CMYK bitmap image data is printed with a plurality of coloring materials (CMYK coloring materials). Thus, since pixels having a text attribute or a graphic attribute are printed using only a black coloring material by gray compensation, there is the advantageous effect that the problem of color misregistration caused by mixing of the CMYK coloring materials can be prevented. Further, since pixels having an image attribute are printed using the CMYK coloring materials, higher gradation can be achieved.

A filter processing unit 603 arbitrarily corrects a spatial frequency of the CMYK bitmap image data.

A gamma correction unit 604 performs gamma correction according to the characteristics of the printer engine.

A halftone correction unit 605 performs arbitrary halftone processing according to a gradation number of the printer engine, and performs arbitrary screen processing and error diffusion processing such as binarization and base-32 conversion.

The processing contents performed by the respective units 601 to 605 can be switched based on the attribute information.

A drum interval delay memory 606 is a memory for superimposing CMYK images by shifting a CMYK printing timing by a drum interval amount in a printing apparatus which has drums for the respective CMYK colors. The drum interval delay memory 606 can delay the printing timing in order to align the positions of the images in the printing apparatus which has four drums for the respective CMYK colors.

The processing for changing the attribute information in the attribute change unit 509 is performed before the attribute information is sent to the output color correction unit 602. Further, after the processing for changing the attribute information has been performed by the attribute change unit 509, the attribute information generated by the DL rasterization unit 507 is sent to the output color correction unit 602, and the above-described gray compensation is applied.

The high-compression PDF data will now be described using FIGS. 1, 2, 3, 10, and 11.

For conventional PDF data, lossy compression is performed by JPEG on all of the regions. Thus, a high compression rate is obtained and there is little deterioration for image regions such as photographs and natural images. On the other hand, for text regions and graphic regions, there are the problems that image deterioration called "mosquito noise" occurs in the high-frequency portions, and that the compression rate also deteriorates.

For high-compression PDF data, region segmentation (e.g., region segmentation for dividing the image data into text regions, graphic regions, and image regions) is performed on the RGB bitmap image data of a scanned paper document. Further, by performing binary compression with MMR on the text regions and the graphic regions, the deterioration in image quality, which is a problem for conventional PDF data, can be suppressed. Moreover, by performing lossy compression with JPEG on the image regions, roughly the same compression rate as conventional PDF data can be obtained.

Thus, for high-compression PDF data, according to the present exemplary embodiment, an image with higher quality than conventional PDF data can be obtained for the text regions and the graphic regions, while maintaining roughly the same compression rate as conventional PDF data.

Figure 1:
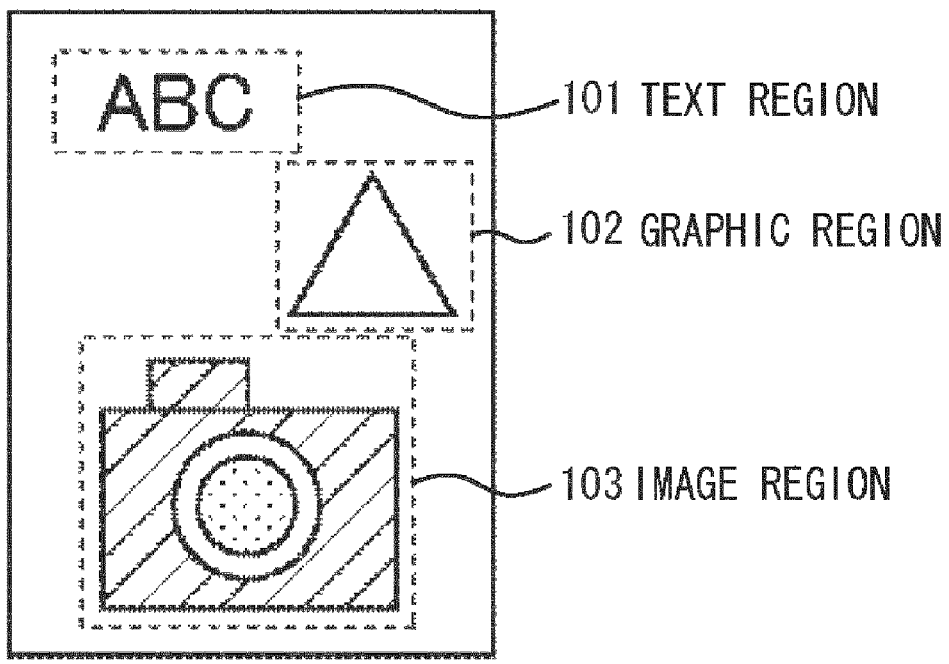
FIG. 1 illustrates region segmentation of high-compression PDF data.

FIG. 1 illustrates the results of region segmentation performed on the RGB bitmap image data of a scanned paper document.

FIG. 1 includes a rectangular region 101, termed a "text region", which includes a text object having a monochromatic color. This text region 101 is constituted by pixels expressing "ABC" and other pixels, i.e., white pixels. Monochromatic means that, for example, the single character "A" in the text region 101 is not expressed by a plurality of colors. Namely, if a single character "A" of the text is expressed by a color which changes from blue (R=0, G=0, B=255) to red (R=255, G=0, B=0), this is not monochromatic. However, for RGB bitmap image data of a scanned paper document, unevenness may occur in the values read by the scanning. For example, it is common that the pixel values for blue vary like (R=10, G=10, B=255) and (R=15, G=10, B=245). Such a case is considered to be monochromatic.

FIG. 1 also includes a rectangular region 102, termed a "graphic region", which includes a graphic object (e.g., a line, a line drawing, an illustration etc.) having a monochromatic color. This graphic region 102 is constituted by pixels expressing a "triangle" and other pixels, i.e., white pixels.

FIG. 1 also includes a rectangular region 103, termed an "image region", which includes an image object, such as a photograph or a natural image having gradation.

After the region segmentation, binary compression by MMR is performed on the text region 101 and the graphic region 102. On the other hand, lossy compression by JPEG is performed on the image region 103.

When compressing the text region 101 by MMR, the pixels expressing "ABC" and the other white pixels are compressed by MMR. Strictly speaking, binary compression is performed on the text region of 101, and binary image regions formed from black pixels and white pixels are generated. Then, in these binary image regions, the black pixels expressing "ABC" and the other white pixels are compressed by MMR. The compressed data thus-compressed by MMR is termed "MMR data". Similarly, the compressed data compressed by JPEG is termed "JPEG data".

After generating the binary image, and before performing the compression by MMR, the color of the pixels expressing "ABC" is stored as color information of MMR data, which will be described below.

Figure 2:
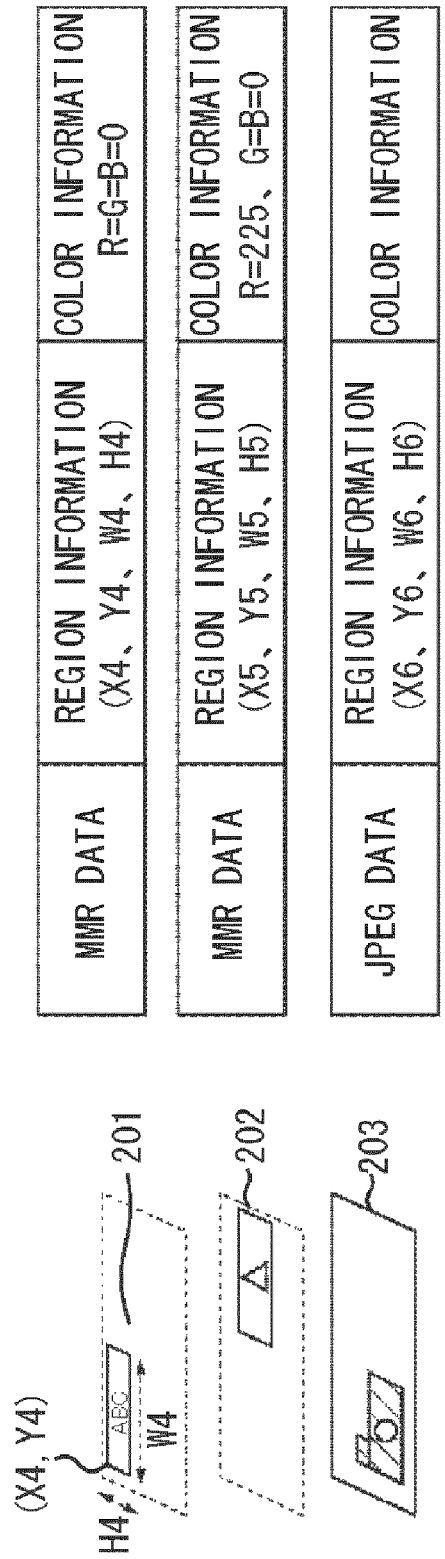
FIG. 2 illustrates a PDF data structure.

FIG. 2 illustrates a data structure of high-compression PDF data. The high-compression PDF data is configured by MMR data 201 of the text region 101, MMR data 202 of the graphic region 102, and JPEG data 203 of the image region 103. In addition to the MMR data 201 and 202 and JPEG data 203, the high-compression PDF data further includes region information (coordinates, width, height) of the respective pieces of data, and color information. For example, the region information of the MMR data 201 is coordinates (X4, Y4), width=W4, height=H4, and the color information is R=G=B=0. When the color information of the MMR data 201 and 202 is the same, this data can be merged into one piece of MMR data.

Next, the printing of the high-compression PDF data will be described. When printing the high-compression PDF data, since the text region 101 of the PDL data sent to the printing apparatus is constituted by the MMR data 201, the text region 101 is described in the rendering command as MMR data.

The intermediate data when printing the high-compression PDF data of FIG. 2 will now be described in more detail using FIG. 10. FIG. 10 includes a rendering command 1001 for rendering the object of MMR data 201, a rendering command 1002 for rendering the object of MMR data 202, and a rendering command 1003 for rendering the object of JPEG data 203. Each of these rendering commands 1001 to 1003 is generated by the DL generation unit 505.

Concerning the method for obtaining the high-compression PDF data, in addition to the above-described method, binary compression may be performed by MMR on all of the text region 101, the graphic region 102, and the image region 103. In this method, region segmentation is not performed on the RGB bitmap image data of the scanned paper document, but binary compression by MMR is performed on all of the regions. This is a compression method for obtaining a high-quality image of paper documents in which determination as to a text region by region segmentation is difficult, such as paper documents which include hand written characters, crossed-out characters, and superscript characters. The high-compression PDF data obtained by such a compression method is termed high-compression PDF data (all regions MMR).

Figure 3:
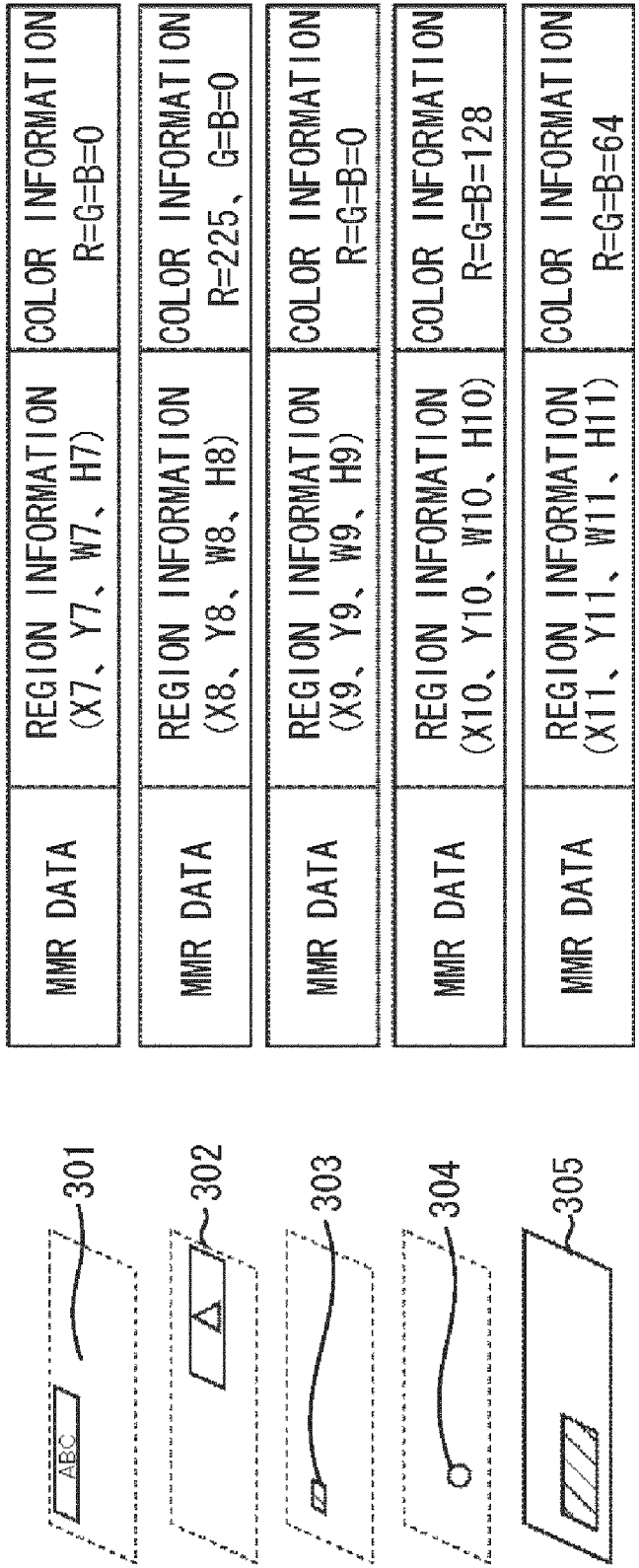
FIG. 3 illustrates a PDF data structure.

FIG. 3 illustrates a data structure of high-compression PDF data (all regions MMR). The PDF data structure of the high-compression PDF data (all regions MMR) is configured entirely by MMR, as illustrated by regions 301 to 305. Similar to the method for combining MMR and JPEG as compression formats, in addition to the MMR data, the PDF data structure includes region information (coordinates, width, height) of the MMR data, and coloring material information.

The intermediate data when printing the high-compression PDF data (all regions MMR) of FIG. 3 will now be described in more detail using FIG. 11. Since regions 301 to 305 are all constituted by MMR data, as illustrated by regions 1101 to 1105 of FIG. 11, regions 301 to 305 are all described by a rendering command indicating MMR data by the DL generation unit 505.

Thus, the rendering commands of the compressed data generated by the DL generation unit 505 are all MMR data or JPEG data for either high-compression PDF data or high-compression PDF data (all regions MMR). Therefore, the attribute information is generated as an image attribute for the compressed data by the DL rasterization unit 507.

Figure 8:
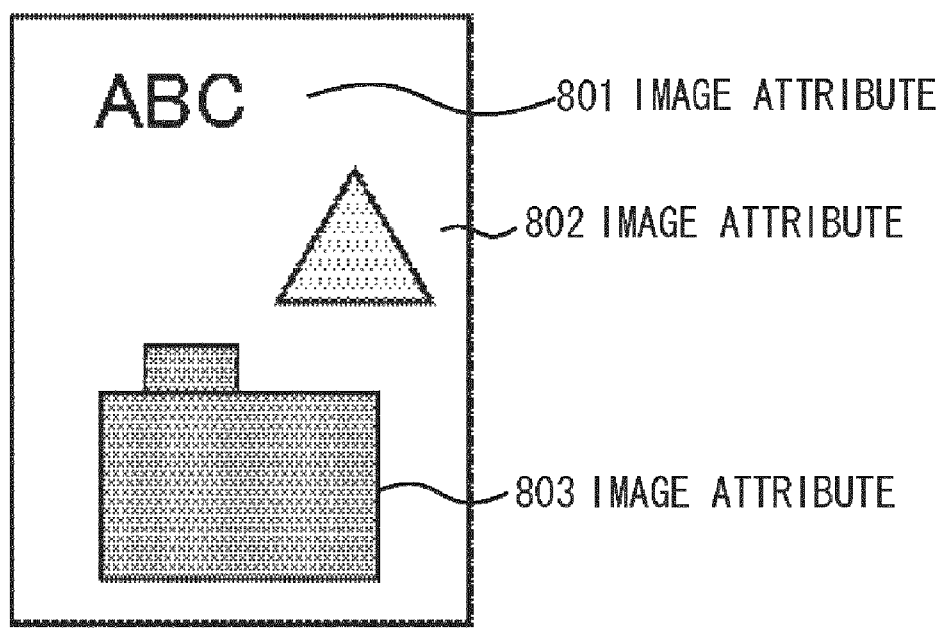
FIG. 8 illustrates attribute information.

FIG. 8 illustrates high-compression PDF data attribute information expressed as 2-bit bitmap image data. As illustrated by image attributes 801 to 803, the attribute information is generated as an image attribute for all of the pieces of compressed data.

If gray compensation is performed by the printer image processing unit 508 on such high-compression PDF data, CMYK bitmap image data in the four CMYK colors is generated for all of the pieces of compressed data. Therefore, the text region 101 and the graphic region 102 of the high-compression PDF data are always printed using CMYK coloring materials. As a result, since printing is performed using CMYK coloring materials even for monochrome text or graphic objects, color misregistration caused by mixing of the coloring materials occurs, and image quality deteriorates.

The processing of the attribute change unit 509, which is a feature of the present exemplary embodiment, will now be described using the flowchart of FIG. 4. As described above, when the attribute information is generated by the DL rasterization unit 507, the attribute change unit 509 performs processing to change the description of the rendering command to optimal attribute information. As a result, when the high-compression PDF data is printed, the problem of color misregistration and image quality deterioration can be resolved, which otherwise may occur due to the printing performed using CMYK coloring materials for all of the pieces of compressed data.

Figure 4:
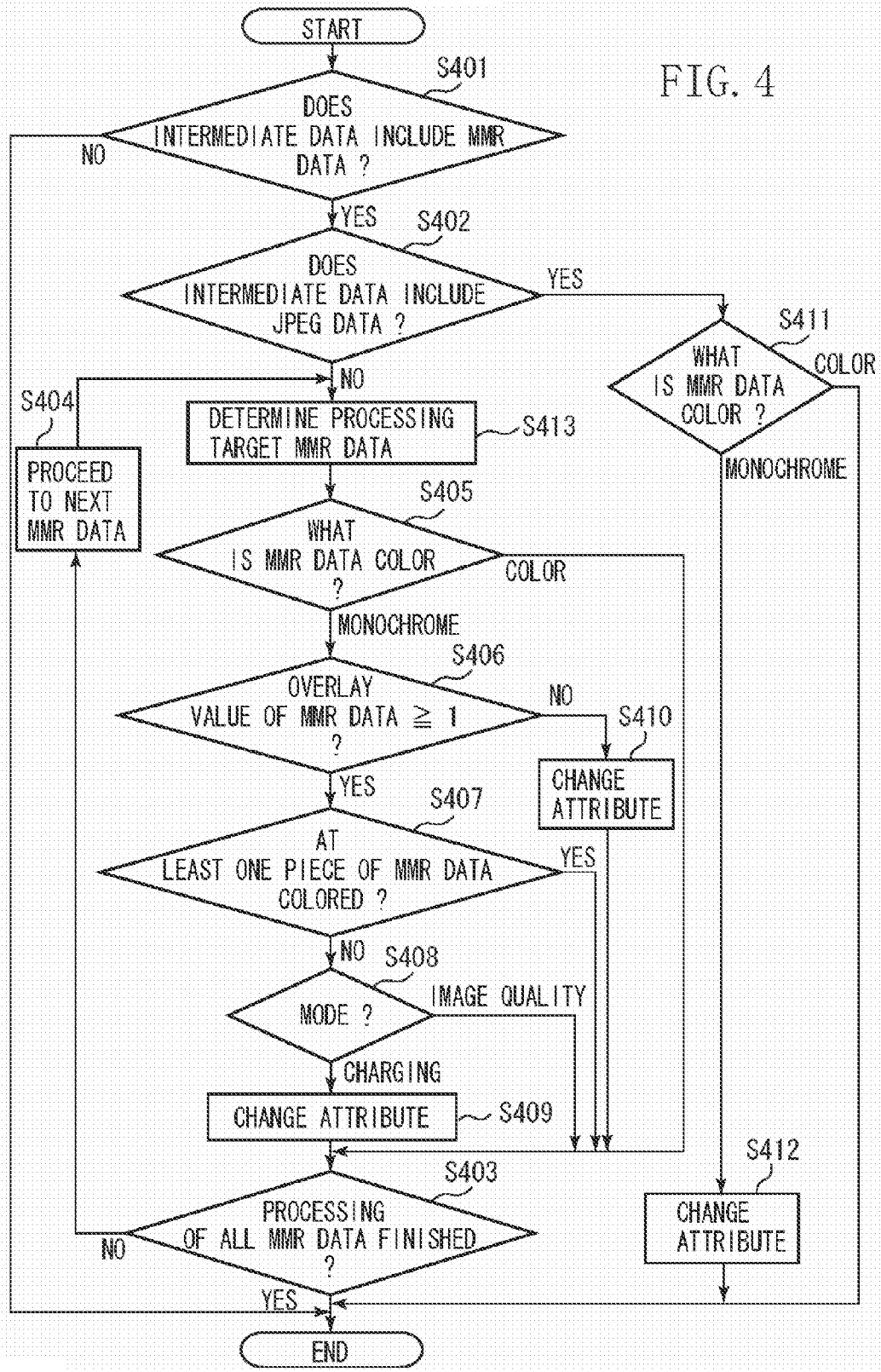
FIG. 4 is a flowchart according to a first exemplary embodiment.

The flowchart of FIG. 4 starts when intermediate data which has undergone color matching by the CMM unit 506 is input into the attribute change unit 509. As the intermediate data, the intermediate data generated from typical PDL data of FIG. 9, the intermediate data generated from the high-compression PDF data of FIG. 10, and the intermediate data generated from the high-compression PDF data (all regions MMR) of FIG. 11 are input. Further, all of the processing in the flowchart of FIG. 4 is performed by the attribute change unit 509.

First, in step S401, the attribute change unit 509 determines whether the input intermediate data includes MMR data. More specifically, the attribute change unit 509 determines whether there is at least one description indicating MMR data in the rendering command for rendering an image object. If it is determined that MMR data is not included (NO in step S401), it is determined that the input intermediate data is not high-compression PDF data or high-compression PDF data (all regions MMR), and the processing ends. If it is determined that MMR data is included (YES in step S401), the processing proceeds to step S402. The intermediate data illustrated in FIG. 9 does not include MMR data, and thus the processing ends. However, since the intermediate data illustrated in FIGS. 10 and 11 does include MMR data, the processing proceeds to step S402.

The reason for determining in step S401 whether the intermediate data includes MMR data will now be described. For example, when gray compensation is applied, an object which has not been compressed is printed with the optimal coloring materials based on the attribute information. However, with respect to the data compressed as described above by MMR, since the attribute information is generated as an image attribute, the object is printed with non-optimal coloring materials, so that the image quality deteriorates. Thus, it is necessary to perform processing by the attribute change unit 509 on the data compressed by MMR. For such a purpose, it is determined in step S401 whether the input intermediate data includes MMR data.

In step S402, the attribute change unit 509 determines whether the intermediate data includes JPEG data when a plurality of pieces of compressed data is present. Here, it is determined whether the intermediate data was compressed in a compression format (MMR) for compressing monochromatic images or in some other compression format (JPEG). As a result, it is determined whether the intermediate data is intermediate data which was generated from high-compression PDF data or from high-compression PDF data (all regions MMR).

Here, similar to step S401, the attribute change unit 509 determines whether there is at least one description indicating JPEG data in the rendering command for rendering an image object. If it is determined that JPEG data is not included (NO in step S402), the input intermediate data was generated from high-compression PDF data (all regions MMR), and the processing proceeds to step S413. If it is determined that JPEG data is included (YES in step S402), the input intermediate data was generated from high-compression PDF data, and the processing proceeds to step S411. Since the intermediate data illustrated in FIG. 10 includes JPEG data, the processing proceeds to step S411. The intermediate data illustrated in FIG. 11 does not include JPEG data, and thus the processing proceeds to step S413.

The reason for determining in step S402 whether the intermediate data includes JPEG data will now be described. As described above, in the high-compression PDF data, text regions and graphic regions are compressed as MMR data, and image regions are compressed as JPEG data. Thus, concerning high-compression PDF data, as illustrated in the below-described step S412, the description of the rendering command may be changed for all MMR data. On the other hand, for high-compression PDF data (all regions MMR), all regions are compressed as MMR data. Thus, if the description of the rendering commands for all of MMR data is changed, for example, attribute information will be generated as a text attribute by the DL rasterization unit 507 even if the region before compression was an image region. Then, in the gray compensation of the output color correction unit 602, printing is performed only with a black coloring material. This results in printing performed only with a black coloring material which has a limited gradation range. Consequently, the problem arises that the gradation of objects included in image regions is deteriorated. To prevent this problem from occurring, in step S402, it is determined whether the intermediate data includes JPEG data, and whether the intermediate data was generated from high-compression PDF data or from high-compression PDF data (all regions MMR). For intermediate data determined to be from high-compression PDF data (all regions MMR), it is necessary to determine, from among the plurality of pieces of MMR data, those pieces of MMR data whose attribute information needs to be changed. This determination is performed in the below-described step S406.

In the present exemplary embodiment, since the compression format used to compress the image regions in the high-compression PDF data is JPEG, it is determined whether JPEG data is included. However, the present invention is not limited to this compression format, and the attribute change unit 509 may determine whether the high-compression PDF data includes compressed data in some other different compression format, as long as such other compression format is not a compression format for compressing monochromatic images.

First, a case where it is determined that a plurality of pieces of compressed data includes JPEG data, that is, that the target data is high-compression PDF data, will be described. In step S411, the attribute change unit 509 determines whether the rendering color of the MMR data is monochrome or a color. This is because when the processing target MMR data is to be rendered in color, CMYK coloring materials have to be used, and processing for changing the attribute information to an attribute which is printed by only a black coloring material does not need to be performed. Further, when there is a plurality of pieces of MMR data, the determination is performed on each piece. As a result of the determination, if it is determined that all of the pieces of MMR data are to be rendered in color, no processing is performed, and the processing ends. On the other hand, if it is determined that there was MMR data to be rendered in monochrome, a determination is made to change the attribute information, and the processing proceeds to step S412. More specifically, a determination is made to perform processing to change the attribute information of the MMR data whose rendering color is monochrome from an attribute (e.g., image attribute) which is printed by a plurality of coloring materials to an attribute (e.g., text attribute, graphic attribute) which is printed by only a black coloring material.

For example, the intermediate data illustrated in FIG. 10 includes two pieces of MMR data, represented by rendering commands 1001 and 1002. The rendering command 1001 is R=G=B=0, and is thus determined to be monochrome. The rendering command 1002 is R=255 and G=B=0, and is thus determined to be a color. Therefore, in step S412, processing is performed on the MMR data described by the rendering command 1001, and processing is not performed on the MMR data described by the rendering command 1002.

In step S412, the attribute change unit 509 determines that the rendering color in step S411 is monochrome, and performs processing to change the attribute information of the piece of MMR data which was determined to undergo the processing for changing the attribute information. More specifically, the attribute change unit 509 changes the description of the rendering command of the MMR data so that the attribute information is generated as an attribute which is printed using only a black coloring material. Concerning the description method, the DL rasterization unit 507 may only generate the attribute information. For instance, a description such as a comment may also be used. For example, in the intermediate data illustrated in FIG. 10, since the rendering command 1001 is a rendering command indicating monochrome MMR data, by adding a description indicating a text attribute, the description of the rendering command can be changed. In the present exemplary embodiment, when changing the description of the rendering command, the similar results can be obtained if a description indicating a graphic attribute is added. However, if the gray compensation settings are made, when the attribute information is a text attribute, the printing may be performed using only a black coloring material, and when the attribute information is a graphic attribute or an image attribute, the printing may be performed using CMYK coloring materials. Thus, it is desirable to add a description indicating a text attribute, which has a high probability of being printed using only a black coloring material. The same applies in a case of changing the description of the rendering command in other steps as well.

Thus, by changing the description of the rendering command indicating monochrome MMR data, the printing is performed with the coloring material with which the pre-compression region is originally meant to be printed. Thus, the occurrence of color misregistration can be prevented.

Next, the case where it is determined that the plurality of pieces of compressed data does not include JPEG data, namely, that the target data is high-compression PDF data (all regions MMR), will be described. In step S413, the attribute change unit 509 determines the processing target MMR data in the intermediate data in which there is a plurality of pieces of MMR data. For example, the intermediate data illustrated in FIG. 11 is described for five pieces of MMR data, as described by rendering commands 1101 to 1105. Thus, first, the MMR data described by the rendering command 1101 is determined as the processing target MMR data. In step S403, the attribute change unit 509 determines whether the processing of all of the MMR data is finished. If it is determined in step S403 that the processing of all of the MMR data is not finished (NO in step S403), the processing proceeds to step S404. In step S404, the next piece of MMR data becomes the processing target. Through this loop processing, the processing of all of the MMR data is performed.

In step S405, as in step S411, the attribute change unit 509 determines whether the rendering color of the processing target MMR data is monochrome or a color. This is because when the processing target MMR data is rendered in color, CMYK coloring materials have to be used, and processing for changing the attribute information to an attribute which is printed by only a black coloring material does not need to be performed. If it is determined that the rendering color of the MMR data is chromatic, no processing is performed, and the processing proceeds to step S403. If it is determined that the rendering color of the MMR data is monochrome, the processing proceeds to step S406.

Figure 11:
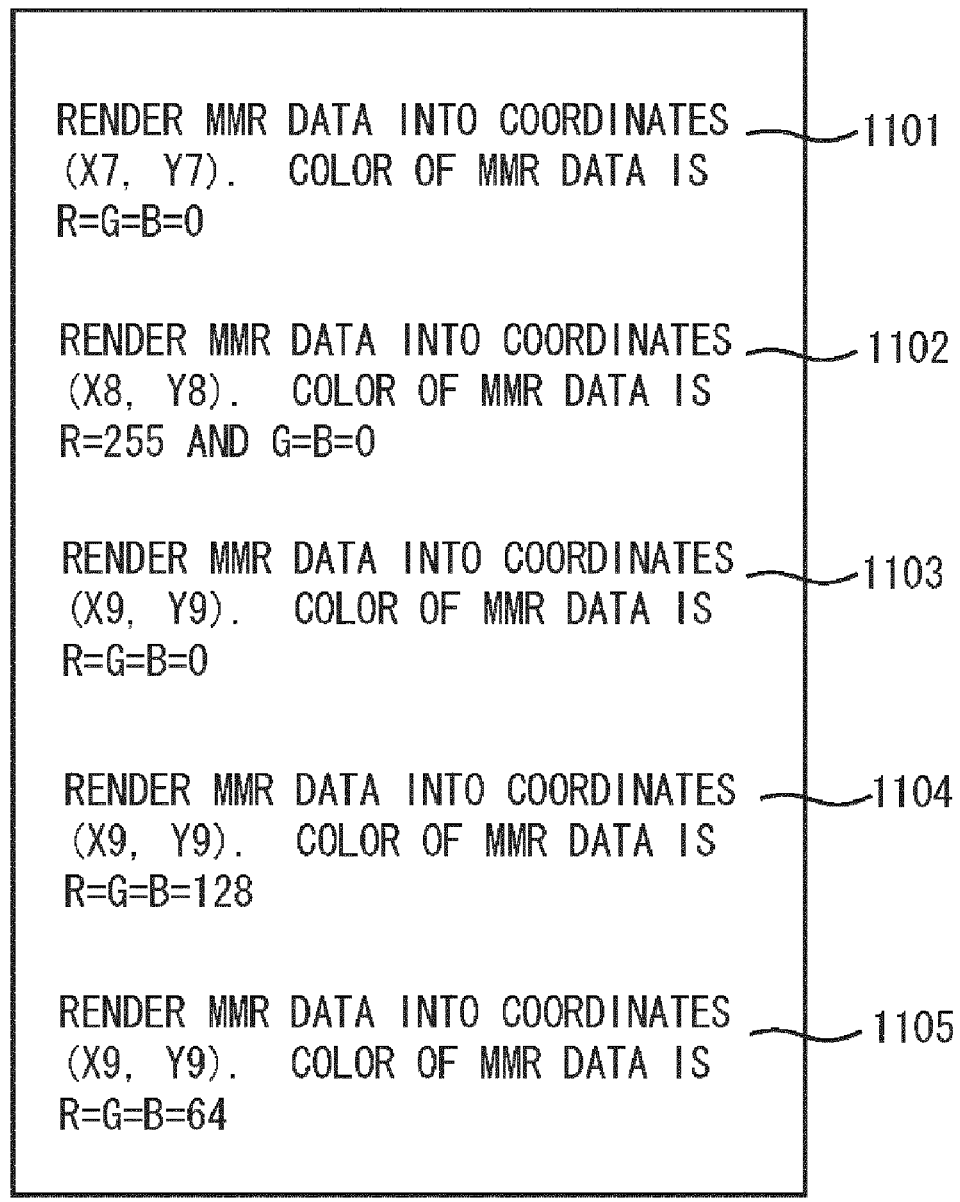
FIG. 11 illustrates intermediate data.

For example, when the intermediate data illustrated in FIG. 11 is described for five pieces of MMR data, as described by rendering commands 1101 to 1105, it is determined as follows.

Rendering command 1101 is R=G=B=0, and is thus determined to be monochrome.

Rendering command 1102 is R=255 and G=B=0, and is thus determined to be chromatic.

Rendering command 1103 is R=G=B=0, and is thus determined to be monochrome.

Rendering command 1104 is R=G=B=128, and is thus determined to be monochrome.

Rendering command 1105 is R=G=B=64, and is thus determined to be monochrome.

Therefore, when the MMR data described in the rendering commands 1101 and 1103 to 1105 is the processing target MMR data, the processing proceeds to step S406. When the MMR data described in the rendering command 1102 is the processing target MMR data, the processing proceeds to step S403.

As described above, with respect to intermediate data which is determined to be high-compression PDF data (all regions MMR), the pre-compression region may be a text region, a graphic region, and an image region. Thus, it needs to be determined, from among the plurality of pieces of MMR data, which pieces of MMR data should be subjected to processing for changing the attribute information. Therefore, in step S406, it is determined what kind of region the pre-compression region of the processing target MMR data was. More specifically, in the region determination of the present exemplary embodiment, it is determined whether before compression the processing target MMR data was an image region.

In the present exemplary embodiment, if a piece of MMR data is overlaid with another piece of MMR data, it is determined that the pre-compression region of the processing target MMR data was an image region, by using the coordinates, the width, and the height of each MMR data. Here, the overlaying piece of MMR data other than the processing target MMR data is not especially processed. The piece of overlaying MMR data is subjected to processing in steps S413 to S403 as the next processing target MMR data.

To increase the speed of the processing (to decrease the number of total steps), if the processing target MMR data is overlaid with another piece of MMR data, the processing target MMR data and the overlaying MMR data may both be determined to be an image region. In such a case, the overlaying piece of MMR data other than the processing target MMR data already determined to be an image region is excluded from the next processing target MMR data. However, when the attribute information of the processing target MMR data is to be changed in the below-described step S409, the attribute information of overlaying MMR data is similarly subjected to the processing for changing the attribute information. By doing this, the step of again performing the overlaying determination can be omitted for MMR data which is already determined to be overlaying. Thus, the processing speed can be increased.

As described above concerning FIG. 3, the PDF data structure of the high-compression PDF data (all regions MMR) is configured entirely by MMR data, as illustrated by regions 301 to 305. The regions 303 to 305 are pieces of MMR data expressing a "camera" photograph. As to the MMR data of regions 303 to 305, it is desirable to determine that pre-compression regions are an image region.

In step S406, an overlay value of the processing target MMR data is determined. If the overlay value of the processing target MMR data is 1 or more, it is determined that the pre-compression region of the processing target MMR data was a region (image region) in which the attribute information is generated as the attribute which is printed by a plurality of coloring materials. Further, a determination to perform the processing for changing the attribute information of the processing target MMR data is not made, and the processing proceeds to step S407. If the overlay value of the processing target MMR data is 0, it is determined that the pre-compression region of the processing target MMR data was a region (text region or graphic region) in which the attribute information is generated as an attribute which is printed by only a black coloring material. Further, a determination is made to perform the processing for changing the attribute information of the processing target MMR data, and the processing proceeds to step S410.

The overlay of the MMR data will now be described using FIG. 12. A state in which MMR data is overlaid represents a state where a region in which a given piece of MMR data is rendered and a region in which a separate piece of MMR data, other than the processing target MMR data, is rendered are adjacent, or overlapping. Further, the "overlay value" is a value indicating how many pieces of separate MMR data are overlaying the processing target MMR data.

Figure 12:
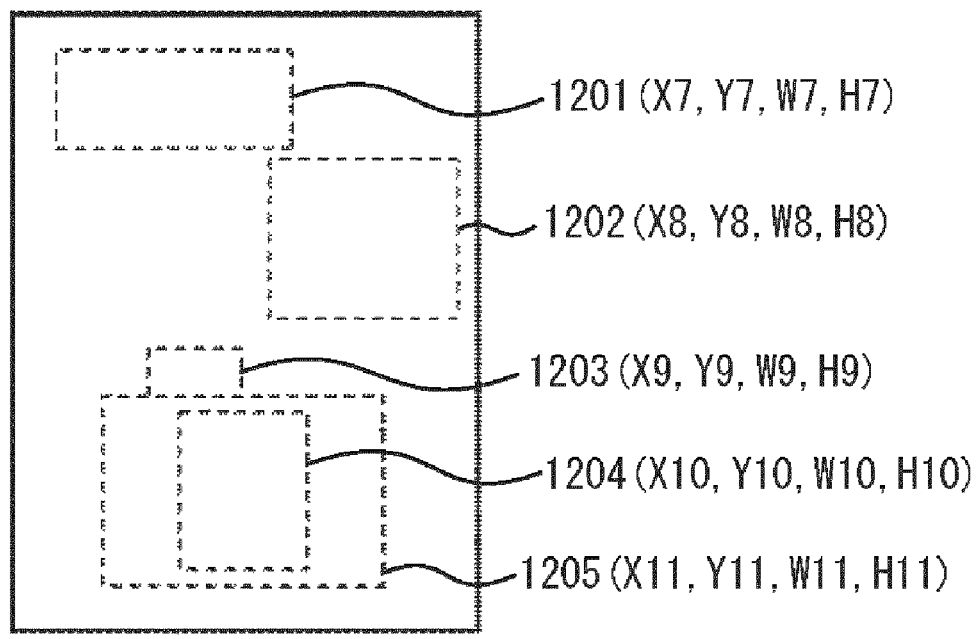
FIG. 12 illustrates overlaying of MMR data.

For example, regions 1201 to 1205 in FIG. 12 represent the region information of the MMR data 301 to 305 illustrated in FIG. 3. Since the regions of 1204 and 1205 are overlapping, regions 1204 and 1205 are determined to be overlaying. Further, since the regions of 1203 and 1205 are adjacent, regions 1203 and 1205 are also determined to be overlaying.

If the overlay value is determined according to the above-described rules, when the processing target MMR data is region 1203 for example, region 1203 is overlaid by the region rendered as 1205. Therefore, the overlay value of the MMR data is 1. Further, for example, when the processing target MMR data is region 1204, region 1204 is overlaid by the region rendered as 1205. Therefore, the overlay value of the MMR data is 1. Still further, for example, when the processing target MMR data is region 1205, region 1205 is overlaid by the regions rendered as 1203 and 1204. Therefore, the overlay value of the MMR data is 2.

When the overlay value of the MMR data is 1 or more, the pieces of MMR data overlaying each other are expressed by different colors, so that there is a very high chance that such MMR data is an image region such as a photograph or a natural image having gradation. Therefore, the pre-compression region of the MMR data is determined as being an image region. Namely, when it is determined that pieces of MMR data are overlaid, it is determined that the pre-compression region of the MMR data was a region in which attribute information is generated as an attribute which is printed by a plurality of coloring materials.

On the other hand, when the overlay value of the MMR data is 0, the processing target MMR data is monochromatically expressed, so that such MMR data will often be a text region or a graphic region. Therefore, the pre-compression region of the MMR data is determined as being a text region or a graphic region. Namely, when it is determined that the pieces of MMR data were not overlaying, it is determined that the pre-compression region of the MMR data was a region in which the attribute information is generated as an attribute which is printed by only a black coloring material.

Next, in step S406, the processing of the intermediate data illustrated in FIG. 11, for example, will be described. When the processing target MMR data is the piece of MMR data which is described by the rendering command 1101, the processing target MMR data is determined not to be overlaid in a rendering region by other MMR data. Therefore, the overlay value of the MMR data is 0, and it is determined that the pre-compression region was a text region or a graphic region.

When the processing target MMR data is the MMR data which is described by the rendering command 1102, since the rendering color is a color, the processing does not proceed to step S406.

When the processing target MMR data is the MMR data which is described by the rendering command 1103, the processing target MMR data is determined to be overlaid in a rendering region by a separate piece of MMR data described by the rendering command 1105. Therefore, the overlay value of the MMR data is 1, and it is determined that the pre-compression region was an image region.

When the processing target MMR data is the MMR data which is described by the rendering command 1104, the processing target MMR data is determined to be overlaid by a rendering region by a separate piece of MMR data described by the rendering command 1105. Therefore, the overlay value of the MMR data is 1, and it is determined that the pre-compression region was an image region.

When the processing target MMR data is the MMR data which is described by the rendering command 1105, the processing target MMR data is determined to be overlaid in rendering regions by separate pieces of MMR data described by the rendering commands 1103 and 1104. Therefore, the overlay value of the MMR data is 2, and it is determined that the pre-compression region was an image region.

Therefore, since only the MMR data described by the rendering command 1101 is determined as having an overlay value of 0, the processing proceeds to step S410. For the MMR data described by rendering commands 1103 to 1105, the processing proceeds to step S407.

In step S410, based on a determination made in a manner similar to step S412, the attribute information of the processing target MMR data is changed, whose rendering color was determined to be monochrome and whose overlay value was determined to be 0 in steps S405 and 406. Then, after the attribute information is changed, the processing proceeds to step S403.

Thus, in the present exemplary embodiment, it is determined what kind of region the pre-compression region of the processing target MMR data was by estimation based on the overlay value of the processing target MMR data. As a result, it is not necessary to analyze what kind of region the pre-compression region originally was, and it becomes possible to generate the attribute information which enables optimal printing for the region. In the present exemplary embodiment, to simplify the processing, the pre-compression region of the target MMR data is estimated based on the overlay value. However, the present invention may also have a configuration in which the processing for changing the attribute information is performed by analyzing what kind of region the pre-compression region of the processing target MMR data was, and changing the description of the rendering command based on that analysis result.

Next, a charging method when printing the high-compression PDF data (all regions MMR) will be described.

First, if at least one piece of MMR data is to be rendered in color, the intermediate data is considered as a color page, and a fee for performing color printing is charged. Here, the charging of a fee for performing color printing is termed "color charging". On the other hand, when all of the pieces of MMR data are to be rendered in monochrome, the intermediate data is considered as a monochrome page, and a fee for performing monochrome printing is charged. Here, the charging of a fee for performing monochrome printing is termed "monochrome charging". Generally, the color charging fee is higher than the monochrome charging fee.

AS described above, in the monochrome MMR data included in the intermediate data which is generated from high-compression PDF data (all regions MMR), when the pre-compression region was determined to be an image region, the optimum attribute for printing the region at a high image quality, is an image attribute. However, pixels and regions having an image attribute are subject to color charging because printing is performed using the four CMYK coloring materials.

Therefore, if at least one piece of MMR data is to be rendered in color, the color charging is not a problem. However, when there is a region which was determined to be an image region, even if all MMR data are to be rendered in monochrome, color charging is performed. As a result, the problem arises that a user has to pay extra for color charging when the user scans and prints a monochrome paper document which includes an image region.

Steps S407 and S408 are steps for resolving this problem. In steps S407 and S408, processing is performed to realize monochrome charging even in cases where all MMR data are rendered in monochrome, and at least one pre-compression region of the MMR data was determined to be an image region.

In step S407, the attribute change unit 509 determines whether the rendering color for at least one piece of MMR data is chromatic among all of the MMR data. If it is determined that the rendering color for at least one piece of MMR data is chromatic (YES in step S407), since that piece of MMR data is printed using the four CMYK coloring materials, there is no problem with color charging. Therefore, no processing is performed, and the processing proceeds to step S403. On the other hand, if it is determined that the rendering color for all of the MMR data is not chromatic (NO in step S407), it is determined that the rendering color for all of the MMR data is monochrome, and the processing proceeds to step S408.

According to the present exemplary embodiment, determination as to whether the rendering color for at least one piece of MMR data among all of the MMR data is chromatic is performed during the processing of the target MMR data. However, the determination may be made before determining the processing target MMR data, and the determination result may be subsequently referred to using a flag or the like. By using such a configuration, the determination no longer has to be performed each time the processing target MMR data changes, so that the processing becomes simpler.

When the rendering color for all of the MMR data is monochrome, the user may want to perform color printing in which a high quality image with the image regions showing gradation is obtained even though a higher fee is charged. Alternatively, the user may want to perform monochrome printing with an inexpensive fee even though the image quality will be low.

Thus, when the rendering color for all of the MMR data is monochrome, it is desirable that the user can select whether the MMR data determined to be an image region before compression should acquire an image attribute subject to color charging or a text (or graphic) attribute subject to monochrome charging.

In Step S408, the above selection can be performed by determining a mode which is set by the printing apparatus and performing the processing based on that determination. This mode is designated by the user beforehand during the printing of the high-compression PDF data (all regions MMR) and set in the printing apparatus. The modes include an image priority mode and a charging priority mode. In the image priority mode, the printing is performed using the four CMYK coloring materials on the monochrome MMR data determined to be an image region. On the other hand, in the charging priority mode, the printing is performed using only a black coloring material on the monochrome MMR data determined to be an image region.

In step S408, as a result of the mode determination, if it is determined that the mode is set to image priority mode, no processing is performed, and the processing proceeds to step S403. On the other hand, if it is determined that the mode is set to charging priority mode, a determination is made to perform the processing for changing the attribute information of the processing target MMR data, and the processing proceeds to step S409.

In step S409, the description of the rendering command of the target MMR data which is determined to change the attribute information, is changed. Although the processing target MMR data has a pre-compression region which was determined to have been an image region, to realize monochrome charging, the attribute information needs to be generated as a printing attribute using only a black coloring material by the DL rasterization unit 507. Thus, a description indicating that such attribute is a text attribute, for example, is added to the rendering command of the processing target MMR data. Further, a description indicating a graphic attribute may be added. When a new attribute can be added, a description indicating an attribute such as image attribute (monochrome), for example, may be added. In this case, the gray compensation in the output color correction unit 602 is switched from the existing image attribute to the image attribute (monochrome). Further, while for the existing image attribute, as described above, the CMYK bitmap image data of the four CMYK colors is generated, for image attribute (monochrome), K monochromatic CMYK bitmap image data is generated.

Thus, by performing the processing based on the mode which is set by the printing apparatus, whether to perform color charging with high image quality or to perform monochrome charging with low image quality can be selected based on a user's intention. Therefore, printing with a high degree of responsiveness to a user's demands can be performed.

In the present exemplary embodiment, changing of the attribute information based on the set mode was performed only on the processing target MMR data which was determined to be high-compression PDF data (all regions MMR), and for which it was determined that the rendering color was monochrome and the pre-compression region was an image region. However, the present invention is not limited to this embodiment. First, it may be determined whether the rendering color of the compressed data is monochrome, and then if it is determined that the rendering color is monochrome, processing may be performed for changing the attribute information of all of the compressed data to an attribute which is printed by only a black coloring material.

In the present exemplary embodiment, before generating the attribute in the DL rasterization unit 507, a determination was made to perform the processing for changing the attribute information of the compressed data by the attribute change unit 509, and then the description of the rendering command was changed based on that determination. Further, processing was performed for changing the attribute information generated by the DL rasterization unit 507 based on the change of the rendering command. However, in addition to that configuration, for example, the following four configurations is also feasible. The present invention may be implemented by any of these configurations.

A first alternative configuration is as follows. The order of the attribute change unit 509 and the DL rasterization unit 507 illustrated in FIG. 5 is switched. The processing is performed by the attribute change unit 509 after the attribute information is generated by the DL rasterization unit 507. The present problem is resolved by the attribute change unit 509 performing the processing for changing the generated attribute information instead of the rendering command.

A second alternative configuration is as follows. The attribute change unit 509 does not change the rendering command, but sends change information indicating a change in attribute information to the DL rasterization unit 507 together with the intermediate data. The problem is resolved by generating the attribute information based on the change information, in addition to the rendering command of the intermediate data.

A third alternative configuration is as follows. The attribute change unit 509 illustrated in FIG. 5 is placed before the DL generation unit 505. Further, the processing for determining whether to cause the attribute change unit 509 to perform the processing for changing the attribute information is performed before the intermediate data is generated by the DL generation unit 505. When the DL generation unit 505 is generating the intermediate data, the rendering command is described in which the determination to perform the processing for changing the attribute information is reflected. The present problem is resolved by generating the attribute information based on the description of the rendering command in which the determination to cause the DL rasterization unit 507 to perform the processing for changing the attribute information is reflected.

A fourth alternative configuration is as follows. When the attribute change unit 509 compresses a region including an object, a decision is made to perform processing for changing the attribute information beforehand based on the original pre-compression object attribute. When the rendering command of the compressed data is generated, the description of the rendering command is generated in which the determination to perform the processing for changing the attribute information is reflected. The present problem is resolved by generating the attribute information based on the description of the rendering command in which the determination to cause the DL rasterization unit 507 to perform the processing for changing the attribute information is reflected.

The present invention may be applied as an exemplary embodiment to a system which is configured from a plurality of devices (e.g., a host computer, interface device, reader, printer etc.), or applied to an apparatus (e.g., a copying machine, facsimile apparatus etc.) configured from one device.

The object of the present invention may also be achieved by supplying a recording medium, on which a software program code for realizing the functions of the above exemplary embodiment is stored, to a system or an apparatus, and having a computer (or a central processing unit (CPU) or a micro processing unit (MPU)) of the system or apparatus read and execute the program code stored in the recording medium. In this case, the program code itself read from the recording medium realizes the novel functions of the present invention, so that the recording medium on which the program code is recorded constitutes an embodiment of the present invention. Examples of storage media which can be used for supplying the program code include a floppy disk, a hard disk, an optical disk, a magneto-optical disk, a digital versatile disk read only memory (DVD-ROM), a DVD recordable (DVD-R), a compact disc ROM (CD-ROM), a CD-R, a magnetic tape, a non-volatile memory card and the like.

Further, the present invention also includes embodiments where, based on an instruction from that program code read by the computer, an operating system (OS) or the like running on the computer performs part or all of the actual processing, and by that processing the functions of the above-described exemplary embodiment are realized.

Further, the present invention also includes cases where the program code read from the recording medium is written into a memory of a function expansion board inserted into the computer or a function expansion unit connected to the computer. Then, based on an instruction from the program code, a CPU or the like provided on the function expansion board or function expansion unit performs part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-142938 filed May 30, 2008, which is hereby incorporated by reference herein in its entirety.

What is claimed is:

1. An image processing apparatus which sends attribute information to a selection unit configured to determine based on the attribute information whether to print with only a black coloring material or to print with a plurality of coloring materials, the image processing apparatus comprising:

a determination unit configured to make a determination to perform processing for changing the attribute information of compressed data, whose rendering color is monochrome and which is compressed by a compression format for compressing a monochromatic image, from an attribute which is printed with a plurality of coloring materials to an attribute which is printed with only a black coloring material;

a change unit configured to perform the processing for changing the attribute information of the compressed data based on the determination made by the determination unit before the attribute information is sent to the selection unit;

a region determination unit configured to determine what kind of region a pre-compression region of the compressed data was, wherein the determination unit is configured to make a determination to perform the processing for changing the compressed data when it is determined by the region determination unit that in the pre-compression region the attribute information is generated as an attribute which is printed by only a black coloring material, and wherein the determination unit is configured to make a determination not to perform the processing for changing the attribute information of the compressed data when it is determined by the region determination unit that in the pre-compression region the attribute information is generated as an attribute which is printed by a plurality of coloring materials, wherein the region determination unit is configured to determine whether the compressed data is overlaying another compressed data, and when it is determined that the compressed data is overlaying another compressed data, determine that in the pre-compression region the attribute information is generated as an attribute which is printed by the plurality of coloring materials, and when it is determined that the compressed data is not overlaying another compressed data, determine that in the pre-compression region the attribute information is generated as an attribute which is printed by only a black coloring material.

2. The image processing apparatus according to claim 1, wherein the determination unit makes a determination to perform the processing for changing the attribute information of the compressed data when gray compensation is applied by the image processing apparatus.

3. The image processing apparatus according to claim 1, wherein the compression format for compressing the monochromatic image is any of MMR, JBIG, or PNG.

4. The image processing apparatus according to claim 1, wherein the attribute which is printed with only a black coloring material is a text attribute and a graphic attribute, and
wherein the attribute which is printed with a plurality of coloring materials is an image attribute.

5. The image processing apparatus according to claim 1, wherein the region in which the attribute information is generated as an attribute which is printed by only a black coloring material is a text region and a graphic region, and
wherein the region in which the attribute information is generated as an attribute which is printed by the plurality of coloring materials is an image region.

6. The image processing apparatus according to claim 1, wherein, when a plurality of pieces of the compressed data exists, if the plurality of pieces of the compressed data includes data compressed by a compression format different from the compression format for compressing the monochromatic image, the determination unit determines that a rendering color included in the plurality of pieces of compressed data is monochrome and, the processing for changing the attribute information of the data compressed by the compression format is performed.

7. The image processing apparatus according to claim 6, wherein the different compression format is JPEG.

8. The image processing apparatus according to claim 1, further comprising a mode determination unit configured to determine a mode which is set in the image processing apparatus,
wherein the determination unit determines to perform the processing for changing the attribute information of the compressed data when a rendering color of all of the compressed data is monochrome and when it is determined by the mode determination unit that a charging priority mode is set.

9. The image processing apparatus according to claim 1, wherein the change unit is configured to perform processing for changing attribute information of the compressed data by changing a description of a rendering command of the compressed data.

10. The image processing apparatus according to claim 1, wherein after attribute information for the compressed data is generated, the change unit performs processing for changing the attribute information of the generated compressed data.

11. The image processing apparatus according to claim 1, further comprising a printing unit configured to perform printing using a coloring material selected by the selection unit.

12. An image processing apparatus which sends attribute information to a selection unit configured to determine based on the attribute information whether to print with only a black coloring material or to print with a plurality of coloring materials, the image processing apparatus comprising:
a determination unit configured to make a determination to perform processing for changing the attribute information of compressed data, whose rendering color is monochrome and which is compressed by a compression format for compressing a monochromatic image, from an attribute which is printed with a plurality of coloring materials to an attribute which is printed with only a black coloring material;
a change unit configured to perform the processing for changing the attribute information of the compressed data based on the determination made by the determination unit before the attribute information is sent to the selection unit;
a region determination unit configured to determine what kind of region a pre-compression region of the compressed data was, wherein the determination unit is configured to make a determination to perform the processing for changing the compressed data when it is determined by the region determination unit that in the pre-compression region the attribute information is generated as an attribute which is printed by only a black coloring material, and
wherein the determination unit is configured to make a determination not to perform the processing for changing the attribute information of the compressed data when it is determined by the region determination unit that in the pre-compression region the attribute information is generated as an attribute which is printed by a plurality of coloring materials,
wherein, when a plurality of pieces of the compressed data exists, if the plurality of pieces of the compressed data does not include data compressed by a compression format different from the compression format for compressing the monochromatic image, the determination unit determines that a rendering color included in the plurality of pieces of the compressed data is monochrome and, if the compressed data whose attribute information is an attribute printed by the plurality of coloring materials is a region in which the attribute information is generated as an attribute whose pre-compression region is printed by only a black coloring material, the determination unit determines that the processing for changing the attribute information of the data compressed is performed.

13. A method for controlling an image processing apparatus which sends attribute information to a selection unit configured to determine based on the attribute information whether to print with only a black coloring material or to print with a plurality of coloring materials, the method comprising:
making a determination to perform processing for changing the attribute information of compressed data, whose rendering color is monochrome and which is compressed by a compression format for compressing a monochromatic image, from an attribute which is printed with a plurality of coloring materials to an attribute which is printed with only a black coloring material; and
performing the processing for changing the attribute information of the compressed data based on the determination before the attribute information is sent to the selection unit;
determining what kind of region a pre-compression region of the compressed data was, wherein a determination is made to perform the processing for changing the compressed data when it is determined that in the pre-compression region the attribute information is generated as an attribute which is printed by only a black coloring material, and
wherein a determination is made not to perform the processing for changing the attribute information of the compressed data when it is determined that in the pre-compression region the attribute information is generated as an attribute which is printed by a plurality of coloring materials,
determining whether the compressed data is overlaying another compressed data, and when it is determined that the compressed data is overlaying another compressed data, determining that in the pre-compression region the attribute information is generated as an attribute which is printed by the plurality of coloring materials, and when it is determined that the compressed data is not overlaying another compressed data, determining that in the pre-compression region the attribute information is generated as an attribute which is printed with only a black coloring material.

14. The method according to claim 13, further comprising making a determination to perform the processing for changing the attribute information of the compressed data when gray compensation is applied by the image processing apparatus.

15. The method according to claim 13, wherein the compression format for compressing the monochromatic image is any of MMR, JBIG, or PNG.

16. The method according to claim 13, wherein the attribute which is printed with only a black coloring material is a text attribute and a graphic attribute, and
wherein the attribute which is printed with a plurality of coloring materials is an image attribute.

17. The method according to claim 13, wherein the region in which the attribute information is generated as an attribute which is printed with only a black coloring material is a text region and a graphic region, and
wherein the region in which the attribute information is generated as an attribute which is printed with the plurality of coloring materials is an image region.

18. The method according to claim 13, further comprising, when a plurality of pieces of the compressed data exists, if the plurality of pieces of the compressed data includes data compressed by a compression format different from the compression format for compressing the monochromatic image, making a determination, that a rendering color included in the plurality of pieces of compressed data is monochrome and, the processing for changing the attribute information of the data compressed by the compression format is performed.

19. The method according to claim 18, wherein the different compression format is JPEG.

20. The method according to claim 13, further comprising determining a mode which is set in the image processing apparatus,
wherein a determination is made to perform the processing for changing the attribute information of the compressed data when a rendering color of all of the compressed data is monochrome and when it is determined that a charging priority mode is set.

21. The method according to claim 13, wherein processing is performed for changing attribute information of the compressed data by changing a description of a rendering command of the compressed data.

22. The method according to claim 13, comprising performing the processing for changing the attribute information of the generated compressed data after generating attribute information for the compressed data.

23. The method according to claim 13, further comprising performing printing using a coloring material selected by the selection unit.

24. A method for controlling an image processing apparatus which sends attribute information to a selection unit configured to determine based on the attribute information whether to print with only a black coloring material or to print with a plurality of coloring materials, the method comprising:
making a determination to perform processing for changing the attribute information of compressed data, whose rendering color is monochrome and which is compressed by a compression format for compressing a monochromatic image, from an attribute which is printed with a plurality of coloring materials to an attribute which is printed with only a black coloring material; and
performing the processing for changing the attribute information of the compressed data based on the determination before the attribute information is sent to the selection unit;
determining what kind of region a pre-compression region of the compressed data was, wherein a determination is made to perform the processing for changing the compressed data when it is determined that in the pre-compression region the attribute information is generated as an attribute which is printed by only a black coloring material, and
wherein a determination is made not to perform the processing for changing the attribute information of the compressed data when it is determined that in the pre-compression region the attribute information is generated as an attribute which is printed by a plurality of coloring materials,
wherein, when a plurality of pieces of the compressed data exists, if the plurality of pieces of the compressed data does not include data compressed by a compression format different from the compression format for compressing the monochromatic image, making a determination that a rendering color included in the plurality of pieces of the compressed data is monochrome, and if the compressed data whose attribute information is an attribute printed by the plurality of coloring materials was a region in which the attribute information is generated as an attribute whose pre-compression region is printed with only a black coloring material, making a determination that the processing for changing the attribute information of the data compressed is performed.

25. A non-transitory computer-readable recording medium configured to store a program for causing a computer to execute the method of claim 13.

* * * * *